(12) United States Patent
Chinbe et al.

(10) Patent No.: US 8,498,789 B2
(45) Date of Patent: Jul. 30, 2013

(54) CONTROL APPARATUS AND CONTROL METHOD FOR DRIVE SOURCE

(75) Inventors: Tomohiro Chinbe, Toyota (JP); Hiroyuki Otsuki, Toyota (JP); Atsushi Ayabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/146,562

(22) PCT Filed: Mar. 13, 2009

(86) PCT No.: PCT/JP2009/054855
§ 371 (c)(1),
(2), (4) Date: Jul. 27, 2011

(87) PCT Pub. No.: WO2010/103654
PCT Pub. Date: Sep. 16, 2010

(65) Prior Publication Data
US 2011/0313628 A1 Dec. 22, 2011

(51) Int. Cl.
*G06F 7/00* (2006.01)
(52) U.S. Cl.
USPC .......................................................... 701/54
(58) Field of Classification Search
USPC .......................................................... 701/54
See application file for complete search history.

(56) References Cited

U.S. PATENT DOCUMENTS

2006/0003867 A1* 1/2006 Inagaki et al. ................ 477/113
2009/0291801 A1* 11/2009 Matsubara et al. ............... 477/5

FOREIGN PATENT DOCUMENTS

| JP | A-10-227237 | 8/1998 |
| JP | A-10-311413 | 11/1998 |
| JP | A-2000-54876 | 2/2000 |
| JP | A-2004-225685 | 8/2004 |
| JP | A-2005-155410 | 6/2005 |
| JP | A-2005-199971 | 7/2005 |

OTHER PUBLICATIONS

International Search Report mailed Jun. 9, 2009 issued in International Patent Application No. PCT/JP2009/054855 (with translation).

* cited by examiner

*Primary Examiner* — James Trammell
*Assistant Examiner* — Michael D Lang
(74) *Attorney, Agent, or Firm* — Oliff & Berridge, PLC

(57) ABSTRACT

An ECT torque controlling system sets a torque demand amount. The torque demand amount set by the ECT torque controlling system is converted by a converter of a power train manager into a torque demand amount changing with a delay relative to the set torque demand amount. A selector of the power train manager switches between a state of converting the set torque demand amount into the torque demand amount changing with the delay relative to the set target value and a non-conversion state. An engine controlling system controls an engine so as to achieve the torque demand amount.

3 Claims, 18 Drawing Sheets

FIG. 3

|      | C1 | C2 | C3 | C4 | B1 | B2 | F |
|------|----|----|----|----|----|----|----|
| P    | ×  | ×  | ×  | ×  | ×  | ×  | × |
| R1   | ×  | ×  | ○  | ×  | ×  | ○  | × |
| R2   | ×  | ×  | ×  | ○  | ×  | ○  | × |
| N    | ×  | ×  | ×  | ×  | ×  | ×  | × |
| 1ST  | ○  | ×  | ×  | ×  | ×  | ◎  | △ |
| 2ND  | ○  | ×  | ×  | ×  | ○  | ×  | × |
| 3RD  | ○  | ×  | ○  | ×  | ×  | ×  | × |
| 4TH  | ○  | ×  | ×  | ○  | ×  | ×  | × |
| 5TH  | ○  | ○  | ×  | ×  | ×  | ×  | × |
| 6TH  | ×  | ○  | ×  | ○  | ×  | ×  | × |
| 7TH  | ×  | ○  | ○  | ×  | ×  | ×  | × |
| 8TH  | ×  | ○  | ×  | ×  | ○  | ×  | × |

○ ENGAGEMENT
× DISENGAGEMENT
◎ ENGAGEMENT AT THE TIME OF ENGINE BRAKING
△ ENGAGEMENT ONLY AT THE TIME OF DRIVING

CONTROL APPARATUS AND CONTROL METHOD FOR DRIVE SOURCE

TECHNICAL FIELD

The present invention relates to a control apparatus and a control method for a drive source, particularly to a technique for setting a target value for an output value of a drive source and controlling the output value of the drive source in accordance with the target value.

BACKGROUND ART

Conventionally, there is known an engine in which the value of output torque or the like is determined by an opening position of a throttle valve (hereinafter, also referred to as a throttle opening position) or the like. In addition, an engine is available that is equipped with an electronic throttle valve with a motor serving as an actuator, instead of a throttle valve connected to an accelerator pedal with a wire.

A vehicle equipped with the electronic throttle valve allows control of the throttle opening position based on a factor different from a position of an accelerator pedal (hereinafter, also referred to as an accelerator pedal position), such as a behavior of the vehicle, and control of drive force of the vehicle or the like irrespective of the intention of a driver.

The action of the vehicle may be changed according to engine torque. Accordingly, when controlling the throttle opening position depending on the action of the vehicle or the like, it is advantageous, for the sake of control, to set a target value for engine torque, for example, depending on the action of the vehicle or the like to set a target value for the throttle opening position such that actual engine torque attains the set target value, rather than directly setting a target value for the throttle opening position.

Accordingly, when setting a target value for the throttle opening position depending on the accelerator pedal position, a target value for engine torque is temporarily set based on the accelerator pedal position to control the engine such that actual engine torque attains the set target value.

Japanese Patent Laying-Open No. 2005-155410 (Patent Document 1) discloses an engine torque control apparatus calculating static target engine torque depending on the absolute value of an operated amount of the accelerator pedal or a control amount changing in accordance with the operated amount of the accelerator pedal and dynamic target engine torque depending on a time change rate of the operated amount of the accelerator pedal or the control amount changing in accordance with the operated amount of the accelerator pedal, and determining final target engine torque based on the sum of these static target engine torque and dynamic target engine torque, thereby controlling engine torque.

According to the engine torque control apparatus disclosed in this publication, determining the final target engine torque based on the sum of static target engine torque and dynamic target engine torque to control engine torque achieves a desired acceleration corresponding to a driver's operation of the accelerator pedal following that operation without any transient delay, at the time of starting of the vehicle or the like.
Patent Document 1: Japanese Patent Laying-Open No. 2005-155410

SUMMARY OF INVENTION

Technical Problem

At the time of shifting of an automatic transmission, a target value for engine torque is increased/decreased even without any change in the accelerator pedal position, for the purpose of avoiding a sudden increase in the engine revolution number or the occurrence of shock. For example, the target value for engine torque is decreased with the start of downshifting. When the downshifting is performed as a result of increasing of the accelerator pedal position, engine torque will suddenly increase immediately before the start of downshifting. Therefore, gradually decreasing engine torque after the start of downshifting is desirable for reducing shock. When recovering engine torque immediately before and immediately after the completion of downshifting, promptly increasing engine torque is desirable.

In the case where an engine torque-down amount in an inertia phase during upshifting is small, improving the accuracy rather than the response property of engine torque is preferred. When the torque-down amount is large, increasing the changing speed of engine torque is desirable for improving the response property of engine torque.

Therefore, a technique that can alter the changing speed of engine torque in accordance with various circumstances is desirable.

The present invention was made to solve the above problems, and an object of the present invention is to alter the changing speed of the output value of the drive source in accordance with various circumstances.

Solution to Problem

A control apparatus for a drive source according to an aspect includes a setter that sets a target value for one of an output value of a drive source and an input value to a transmission coupled to the drive source, a converter that converts the set target value into a target value changing with a delay relative to the set target value, a selector that switches between conversion of the set target value into the target value changing with the delay relative to the set target value and non-conversion, and a controller that controls the output value of the drive source in accordance with the target value.

With this configuration, a target value for one of the output value of the drive source and the input value to the transmission coupled to the drive source is set. Switching is made between a state of controlling the output value of the drive source in accordance with the set target value and a state of controlling the output value of the drive source in accordance with the target value changing with the delay relative to the set target value. Accordingly, the changing speed of the output value of the drive source can be altered in accordance with various circumstances.

Preferably, when a difference between the set target value and an actual output value of the drive source is smaller than a threshold value, the selector switches from a state of converting the set target value into the target value changing with the delay relative to the set target value to a non-conversion state.

With this configuration, during a period in which the difference between the set target value and the actual output value of the drive source is greater than the threshold value, the output value of the drive source is controlled in accordance with the target value changing with the delay relative to the set target value. After the difference between the set target value and the actual output value of the drive source falls below the threshold value, the output value of the drive source is controlled in accordance with the set target value. Accordingly, the changing speed of the output value of the drive source when the actual output value of the drive source changes to the target value can be reduced. As a result, shock that may be caused by a change in the output value of the drive source can be reduced.

More preferably, in an inertia phase during downshifting of the transmission, the selector switches from a state of converting the set target value into the target value changing with the delay relative to the set target value to a non-conversion state.

With this configuration, immediately after the start of downshifting, the output value of the drive source is controlled in accordance with the target value changing with the delay relative to the set target value. Accordingly, immediately after the start of downshifting, the changing speed of the output value of the drive source can be reduced. As a result, shock that may occur can be reduced even when the output value of the drive source is increased immediately before the start of downshifting and the output value of the drive source is decreased immediately after the start of downshifting.

More preferably, when a difference between the set target value and an actual output value of the drive source is smaller than a threshold value, the selector selects a state of converting the set target value into the target value changing with the delay relative to the set target value, and when the difference between the set target value and the actual output value of the drive source is greater than the threshold value, the selector selects a state of not converting the set target value into the target value changing with the delay relative to the set target value.

With this configuration, when the difference between the set target value and the actual output value of the drive source is smaller than the threshold value, the output value of the drive source can be controlled in accordance with the target value changing with the delay relative to the set target value. Accordingly, the changing speed of the output value of the drive source can be reduced. Overshoot and undershoot of the output value of the drive source are therefore less likely to occur. As a result, the accuracy of the output value of the drive source can be improved. When the difference between the set target value and the actual output value of the drive source is greater than the threshold value, the output value of the drive source is controlled in accordance with the set target value. Accordingly, the changing speed of the output value of the drive source can be increased. The follow-up characteristic of the actual output value relative to the target value can therefore be improved.

More preferably, the output value of the drive source changes in accordance with a throttle opening of a throttle valve. When the target value is set so as to decrease with the throttle opening being smaller than a threshold value, the selector selects a state of converting the set target value into the target value changing with the delay relative to the set target value, and when the target value is set so as to decrease with the throttle opening being larger than the threshold value, the selector selects a state of not converting the set target value into the target value changing with the delay relative to the set target value.

With this configuration, when the target value is set so as to decrease with the throttle opening being smaller than the threshold value, the difference between the actual output value of the drive source and the set target value may be reduced. This is because the range in which the output value may be decreased is narrow in the state where the throttle opening is small, that is, in the state where the actual output value is low. In this case, the output value of the drive source is controlled in accordance with the target value changing with the delay relative to the set target value. Accordingly, the changing speed of the output value of the drive source can be reduced. Overshoot and undershoot of the output value of the drive source are therefore less likely to occur. As a result, the accuracy of the output value of the drive source can be improved. When the target value is set so as to decrease with the throttle opening being larger than the threshold value, the difference between the actual output value of the drive source and the set target value may be increased. This is because the range in which the output value may be decreased is wide in the state where the throttle opening is small, that is, in the state where the actual output value is high. In this case, the output value of the drive source is controlled in accordance with the set target value. Accordingly, the changing speed of the output value of the drive source can be increased. The follow-up characteristic of the actual output value relative to the target value can therefore be improved.

More preferably, the output value is output torque.

With this configuration, the changing speed of output torque of the drive source can be altered in accordance with various circumstances.

BRIEF DESCRIPTION OF DRAWINGS

FIG. 3 is a working table of the automatic transmission.

REFERENCE SIGNS LIST

Figure 1:
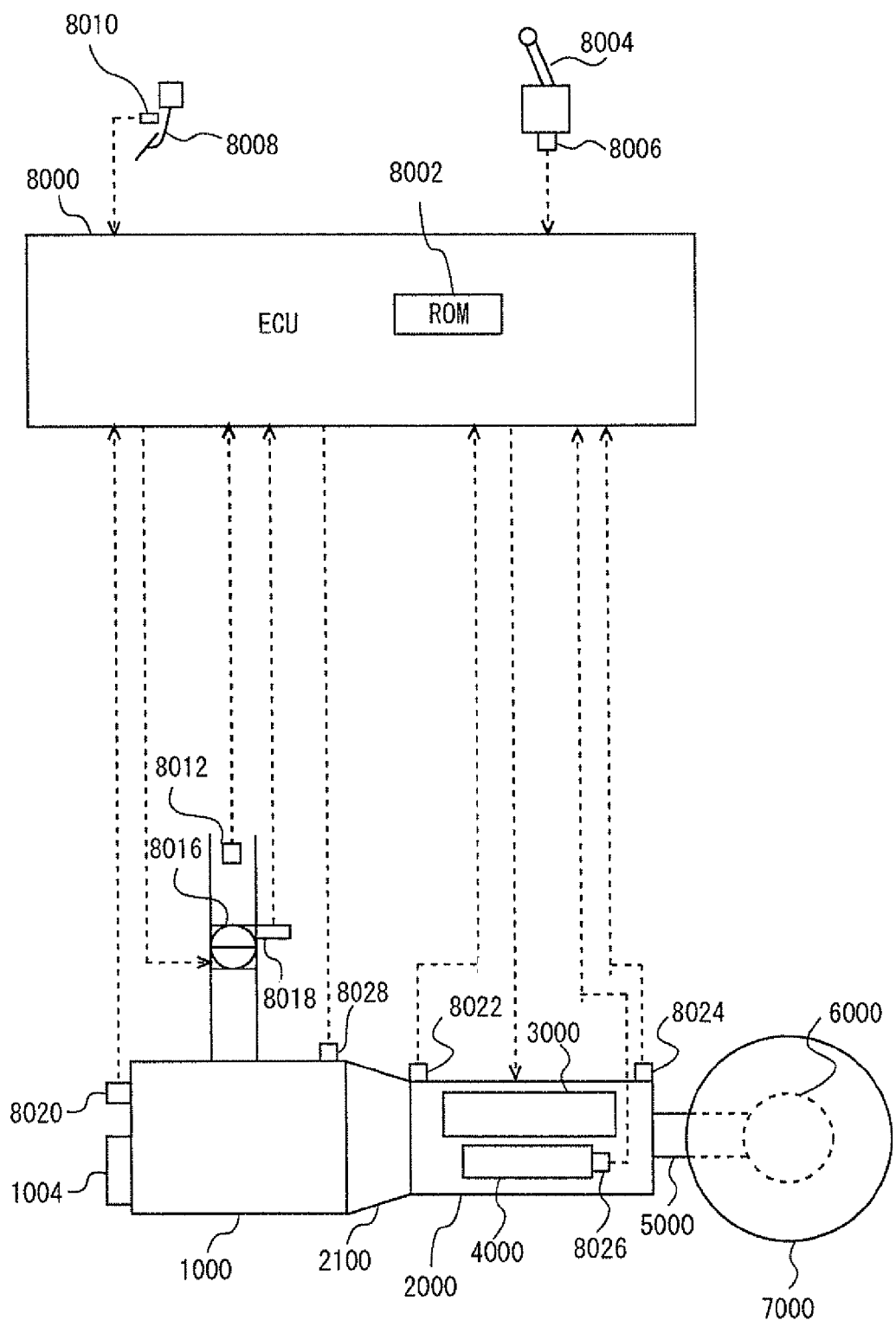
FIG. 1 is a schematic configuration diagram showing a powertrain of a vehicle.

1000 engine, 2000 automatic transmission, 2100 torque converter, 3000 planetary gear unit, 4000 oil hydraulic circuit, 5000 propeller shaft, 6000 differential gear, 7000 rear wheel, 8000 ECU, 8016 electronic throttle valve, 9000 engine controlling system, 9100 power train manager, 9102 accommodator, 9104 selector, 9106 converter, 9200 power train driver model, 9202 static torque setter, 9204 converter, 9210 drivers support system, 9220 VDIM system, 9230 damping control system, 9240 ECT torque controlling system

DESCRIPTION OF EMBODIMENTS

Embodiments of the present invention will be described below with reference to the drawings. In the following description, the same parts are given the same reference numerals. Names and functions thereof are all the same. Therefore, a detailed description thereof will not be repeated.

First Embodiment

With reference to FIG. 1, a vehicle with a control apparatus according to a first embodiment of the present invention installed will be described. This vehicle is an FR (Front engine Rear drive) vehicle. It should be noted that this vehicle may be a vehicle other than the FR vehicle.

The vehicle includes an engine 1000, an automatic transmission 2000, a torque converter 2100, a planetary gear unit 3000 constituting part of automatic transmission 2000, an oil hydraulic circuit 4000 constituting part of automatic transmission 2000, a propeller shaft 5000, a differential gear 6000, rear wheels 7000, and an ECU (Electronic Control Unit) 8000.

Engine 1000 is an internal combustion engine for combusting an air-fuel mixture of fuel injected from an injector (not shown) and the air in a combustion chamber of a cylinder. A piston in the cylinder is pushed down by the combustion and a crankshaft is rotated. An auxiliary machine 1004 such as an alternator and an air conditioner is driven by engine 1000. Output torque of engine 1000 (engine torque TE) is changed in accordance with an actuated amount of an electronic throttle valve 8016, that is, a throttle opening position or the like. It should be noted that a motor may be used as a drive source instead of or in addition to engine 1000. Alternatively, a diesel engine may be used. In the diesel engine, output torque is changed in accordance with the valve opening time of the injector (the actuated amount), that is, a fuel injection amount.

Automatic transmission 2000 is coupled to engine 1000 with torque converter 2100 interposed therebetween. Automatic transmission 2000 implements a desired gear so as to shift the revolution number of the crankshaft to a desired revolution number. It should be noted that a CVT (Continuously Variable Transmission) for continuously changing a gear ratio may be installed instead of the automatic transmission implementing a gear. Further, another automatic transmission configured by a constant-meshing type gear shifted by an oil hydraulic actuator or an electric motor may be installed.

Drive force output from automatic transmission 2000 is transmitted to right and left rear wheels 7000 through propeller shaft 5000 and differential gear 6000.

A position switch 8006 of a shift lever 8004, an accelerator pedal position sensor 8010 of an accelerator pedal 8008, an air flow meter 8012, a throttle opening position sensor 8018 of electronic throttle valve 8016, an engine speed sensor 8020, an input shaft speed sensor 8022, an output shaft speed sensor 8024, an oil temperature sensor 8026, and a water temperature sensor 8028 are connected to ECU 8000 with a harness and the like interposed therebetween.

A position of shift lever 8004 is detected by position switch 8006, and a signal representing a detection result is transmitted to ECU 8000. The gear of automatic transmission 2000 is automatically implemented in response to the position of shift lever 8004. A driver may select a manual shift mode in which the driver can select any gear in accordance with operations of the driver.

Accelerator pedal position sensor 8010 detects a position of accelerator pedal 8008 and transmits a signal representing a detection result to ECU 8000. Air flow meter 8012 detects an amount of air to be taken in engine 1000 and transmits a signal representing a detection result to ECU 8000.

Throttle opening position sensor 8018 detects an opening position of electronic throttle valve 8016 adjusted by an actuator and transmits a signal representing a detection result to ECU 8000. The amount of air to be taken in engine 1000 is adjusted by electronic throttle valve 8016.

It should be noted that the amount of air to be taken in engine 1000 may be adjusted by a variable valve lift system of changing the lift amount or opening/closing phase of an intake valve (not shown) or an exhaust valve (not shown) instead of or in addition to electronic throttle valve 8016.

Engine speed sensor 8020 detects the revolution number of an output shaft (the crankshaft) of engine 1000 (hereinafter, also referred to as engine revolution number NE) and transmits a signal representing a detection result to ECU 8000. Input shaft speed sensor 8022 detects the input shaft revolution number NI of automatic transmission 2000 (the turbine revolution number NT of torque converter 2100) and transmits a signal representing a detection result to ECU 8000. Output shaft speed sensor 8024 detects the output shaft revolution number NO of automatic transmission 2000 and transmits a signal representing a detection result to ECU 8000.

Oil temperature sensor 8026 detects a temperature of oil (ATF: Automatic Transmission Fluid) (an oil temperature) used for actuating and lubricating automatic transmission 2000 and transmits a signal representing a detection result to ECU 8000.

Water temperature sensor 8028 detects a temperature of coolant (a water temperature) of engine 1000 and transmits a signal representing a detection result to ECU 8000.

ECU 8000 controls devices so that the vehicle is in a desired traveling state based on the signals transmitted from position switch 8006, accelerator pedal position sensor 8010, air flow meter 8012, throttle opening position sensor 8018, engine speed sensor 8020, input shaft speed sensor 8022, output shaft speed sensor 8024, oil temperature sensor 8026, water temperature sensor 8028, and the like, a map and a program stored in a ROM (Read Only Memory) 8002. It should be noted that the program to be executed by ECU 8000 may be stored in a recording medium such as a CD (Compact Disc) and a DVD (Digital Versatile Disc) and distributed on the market.

In the present embodiment, ECU 8000 controls automatic transmission 2000 so that any of first to eighth forward gears is implemented in the case where a D (drive) range is selected as a shift range of automatic transmission 2000 by placing shift lever 8004 at a D (drive) position. Since any gear among the first to eighth forward gears is implemented, automatic transmission 2000 can transmit the drive force to rear wheels 7000. It should be noted that a gear of a higher speed than the eighth gear may be implemented in the D range. A gear to be implemented is determined based on a shift map preliminarily prepared by an experiment or the like taking the vehicle speed and the accelerator pedal position as parameters. It should be noted that the ECU may be divided into a plurality of ECUs.

Figure 2:
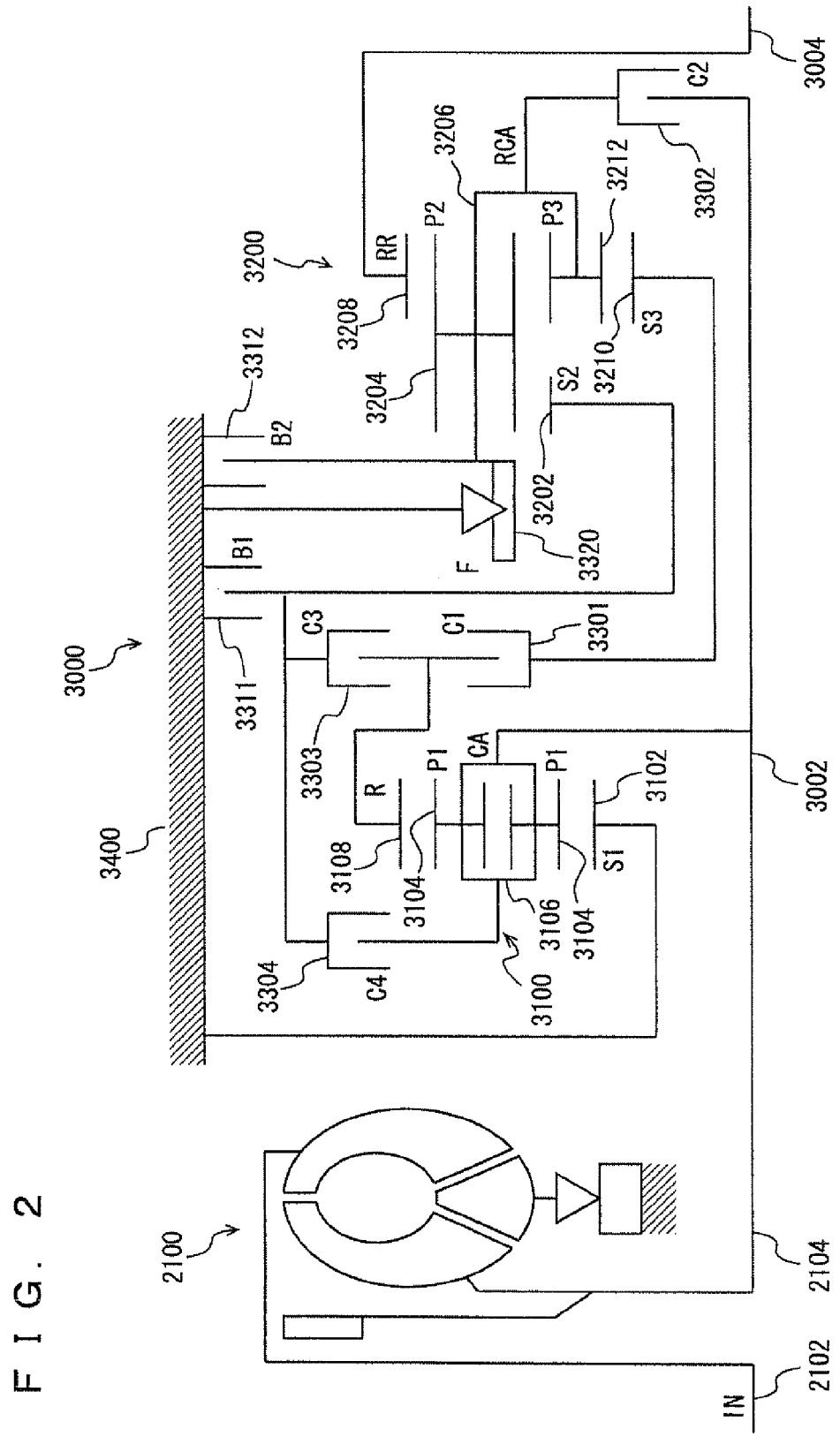
FIG. 2 is a diagram showing a planetary gear unit of an automatic transmission.

With reference to FIG. 2, planetary gear unit 3000 will be described. Planetary gear unit 3000 is connected to torque converter 2100 having an input shaft 2102 coupled to the crankshaft.

Planetary gear unit 3000 includes a front planetary 3100, a rear planetary 3200, a C1 clutch 3301, a C2 clutch 3302, a C3 clutch 3303, a C4 clutch 3304, a B1 brake 3311, a B2 brake 3312, and a one-way clutch (F) 3320.

Front planetary 3100 is a planetary gear mechanism of a double pinion type. Front planetary 3100 includes a first sun gear (S1) 3102, a pair of first pinion gears (P1) 3104, a carrier (CA) 3106, and a ring gear (R) 3108.

First pinion gears (P1) 3104 are meshed with first sun gear (S1) 3102 and first ring gear (R) 3108. First carrier (CA) 3106 supports first pinion gears (P1) 3104 so that first pinion gears (P1) 3104 can be rotated around an outer axis and also around their own axes.

First sun gear (S1) 3102 is fixed to a gear case 3400 so as not to rotate. First carrier (CA) 3106 is coupled to an input shaft 3002 of planetary gear unit 3000.

Rear planetary 3200 is a Ravigneaux type planetary gear mechanism. Rear planetary 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

Second pinion gear (P2) 3204 is meshed with second sun gear (S2) 3202, rear ring gear (RR) 3208, and third pinion gear (P3) 3212. Third pinion gear (P3) 3212 is meshed with third sun gear (S3) 3210 in addition to second pinion gear (P2) 3204.

Rear carrier (RCA) 3206 supports second pinion gear (P2) 3204 and third pinion gear (P3) 3212 so that second pinion gear (P2) 3204 and third pinion gear (P3) 3212 can be rotated around an outer axis and also around their own axes. Rear carrier (RCA) 3206 is coupled to one-way clutch (F) 3320. Rear carrier (RCA) 3206 cannot be rotated when driving in the first gear (when the vehicle travels by using drive force output from engine 1000). Rear ring gear (RR) 3208 is coupled to an output shaft 3004 of planetary gear unit 3000.

One-way clutch (F) 3320 is provided in parallel to B2 brake 3312. That is, an outer race of one-way clutch (F) 3320 is fixed to gear case 3400, and an inner race is coupled to rear carrier (RCA) 3206.

FIG. 3 shows a working table illustrating a relationship between the shift gears and working states of the clutches and the brakes. First to eighth forward gears and first and second reverse gears are implemented by actuating the brakes and the clutches in combinations shown in this working table.

Figure 4:
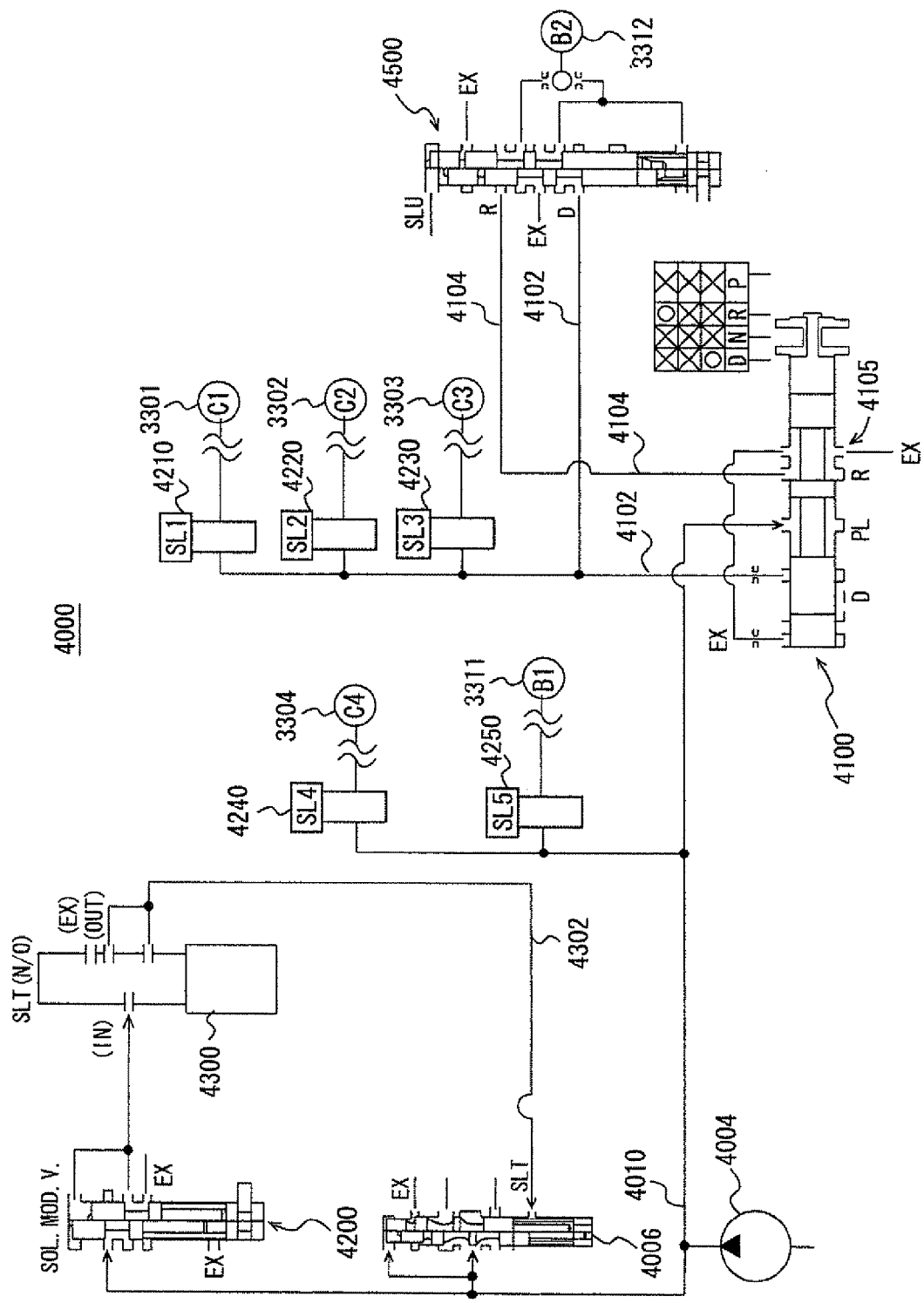
FIG. 4 is a diagram showing an oil hydraulic circuit of the automatic transmission.

With reference to FIG. 4, a principal portion of oil hydraulic circuit 4000 will be described. It should be noted that oil hydraulic circuit 4000 is not limited to the one described below.

Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SL5 linear solenoid (hereinafter, indicated as SL (5)) 4250, an SLT linear solenoid (hereinafter, indicated as SLT) 4300, and a B2 control valve 4500.

Oil pump 4004 is coupled to the crankshaft of engine 1000. Oil pump 4004 is driven by rotation of the crankshaft so as to generate oil pressure. The oil pressure generated in oil pump 4004 is regulated by primary regulator valve 4006 so as to generate line pressure.

Primary regulator valve 4006 is actuated taking throttle pressure regulated by SLT 4300 as pilot pressure. The line pressure is supplied to manual valve 4100 through a line pressure oil channel 4010.

Manual valve 4100 includes a drain port 4105. The oil pressure of a D range pressure oil channel 4102 and an R range pressure oil channel 4104 is discharged from drain port 4105. In the case where a spool of manual valve 4100 is at a D position, line pressure oil channel 4010 communicates with D range pressure oil channel 4102. Therefore, the oil pressure is supplied to D range pressure oil channel 4102. At this point, R range pressure oil channel 4104 communicates with drain port 4105. Therefore, R range pressure of R range pressure oil channel 4104 is discharged from drain port 4105.

In the case where the spool of manual valve 4100 is at an R position, line pressure oil channel 4010 communicates with R range pressure oil channel 4104. Therefore, the oil pressure is supplied to R range pressure oil channel 4104. At this point, D range pressure oil channel 4102 communicates with drain port 4105. Therefore, D range pressure of D range pressure oil channel 4102 is discharged from drain port 4105.

In the case where the spool of manual valve 4100 is at an N position, both D range pressure oil channel 4102 and R range pressure oil channel 4104 communicate with drain port 4105. Therefore, the D range pressure of D range pressure oil channel 4102 and the R range pressure of R range pressure oil channel 4104 are discharged from drain port 4105.

The oil pressure supplied to D range pressure oil channel 4102 is eventually supplied to C1 clutch 3301, C2 clutch 3302, and C3 clutch 3303. The oil pressure supplied to R range pressure oil channel 4104 is eventually supplied to B2 brake 3312.

Solenoid modulator valve 4200 regulates the oil pressure to be supplied to SLT 4300 (solenoid modulator pressure) to a constant level taking the line pressure as source pressure.

SL (1) 4210 regulates the oil pressure supplied to C1 clutch 3301. SL (2) 4220 regulates the oil pressure supplied to C2 clutch 3302. SL (3) 4230 regulates the oil pressure supplied to C3 clutch 3303. SL (4) 4240 regulates the oil pressure supplied to C4 clutch 3304. SL (5) 4250 regulates the oil pressure supplied to B1 brake 3311.

SLT 4300 regulates the solenoid modulator pressure in accordance with a control signal from ECU 8000 based on the accelerator pedal position detected by accelerator pedal position sensor 8010 so as to generate the throttle pressure. The throttle pressure is supplied to primary regulator valve 4006 through an SLT oil channel 4302. The throttle pressure is used as the pilot pressure of primary regulator valve 4006.

SL (1) 4210, SL (2) 4220, SL (3) 4230, SL (4) 4240, SL (5) 4250, and SLT 4300 are controlled by the control signal sent from ECU 8000.

B2 control valve 4500 selectively supplies the oil pressure from one of D range pressure oil channel 4102 and R range pressure oil channel 4104 to B2 brake 3312. D range pressure oil channel 4102 and R range pressure oil channel 4104 are connected to B2 control valve 4500. B2 control valve 4500 is controlled by the oil pressure supplied from an SLU solenoid valve (not shown) and the urge of a spring.

In the case where the SLU solenoid valve is ON, B2 control valve 4500 attains the left side state of FIG. 4. In this case, B2 brake 3312 is supplied with oil pressure obtained by regulating the D range pressure taking the oil pressure supplied from the SLU solenoid valve as the pilot pressure.

In the case where the SLU solenoid valve is OFF, 92 control valve 4500 attains the right side state of FIG. 4. In this case, B2 brake 3312 is supplied with the R range pressure.

Figure 5:
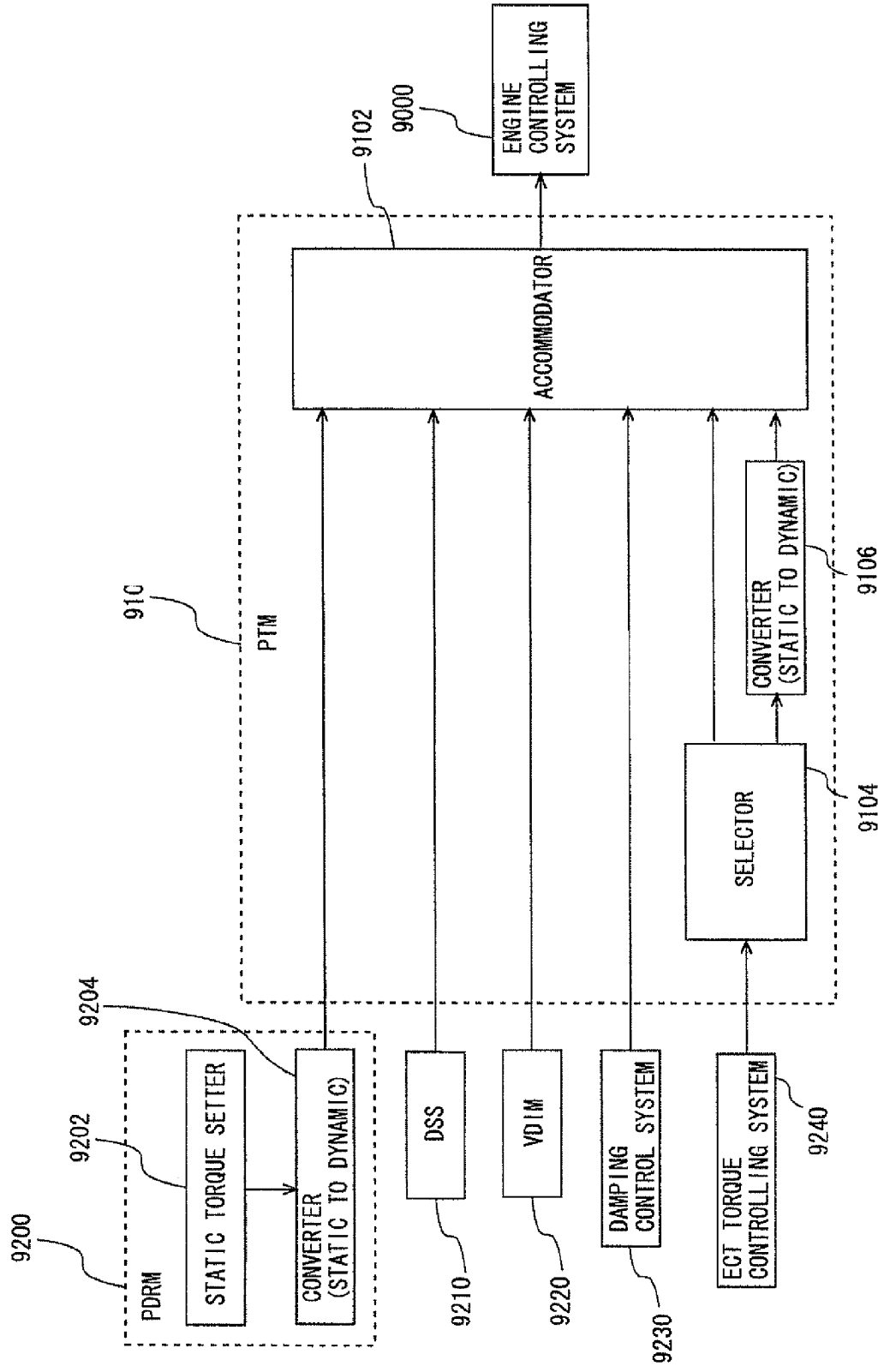
FIG. 5 is a diagram showing a system configuration of a control apparatus according to a first embodiment.

With reference to FIG. 5, a system configuration of the control apparatus according to the present embodiment will be described. It should be noted that functions of the configuration described below may be implemented by either hardware or software.

As shown in FIG. 5, the control apparatus includes an engine controlling system 9000, a power train manager (PTM) 9100, a power train driver model (PDRM) 9200, a drivers support system (DSS) 9210, a VDIM (Vehicle Dynamics Integrated Management) system 9220, a damping control system 9230, and an ECT (Electronic Controlled Transmission) torque controlling system 9240.

Engine controlling system 9000 controls the device provided in engine 1000 for controlling the output torque of engine 1000 such as electronic throttle valve 8016, spark, and an EGR (Exhaust Gas Recirculation) valve in order to realize the dynamic torque demand amount input from power train manager 9100.

The torque demand amount is set as a target value for output torque of engine 1000. The torque demand amount may be set as a target value for input torque to automatic transmission 2000. Alternatively, instead of the torque demand amount, a power demand amount may be set as a target value for output power of engine 1000 or input power to automatic transmission 2000. A demand amount of drive force may be set as a target value for output torque or output power of engine 1000, or a target value for input torque or input power to automatic transmission 2000.

The dynamic torque demand amount indicates a torque demand amount in a transition state where the output torque of engine 1000 may change. The static torque demand amount indicates a torque demand amount in a state where the output torque of engine 1000 is stabilized.

Power train manager 9100 sets the dynamic torque demand amount finally used for controlling engine 1000 based on the dynamic torque demand amount input from power train driver model 9200, drivers support system 9210, VDIM system 9220, damping control system 9230, and ECT torque controlling system 9240.

More specifically, in an accommodator 9102, power train manager 9100 accommodates the dynamic torque demand amount received from power train driver model 9200, drivers support system 9210, VDIM system 9220, damping control system 9230, and ECT torque controlling system 9240, thereby selecting the dynamic torque demand amount finally used for controlling engine 1000.

For example, the minimum torque demand amount is selected, or the maximum torque demand amount is selected, or a torque demand amount received from a particular system is selected. The method of accommodating the torque demand amount is altered in accordance with an operation state of the vehicle or the like. For example, during shifting of automatic transmission 2000, the torque demand amount received from ECT torque controlling system 9240 is used for controlling engine 1000.

The dynamic torque demand amount accommodated by accommodator 9102 is output to engine controlling system 9000.

Power train driver model 9200 is a model (a function) used for setting a torque demand amount relative to engine 1000 based on the operations of the driver. In the present embodiment, a static torque demand amount is set from the accelerator pedal position according to a map predetermined based on results of an experiment, simulation, or the like.

Figure 6:
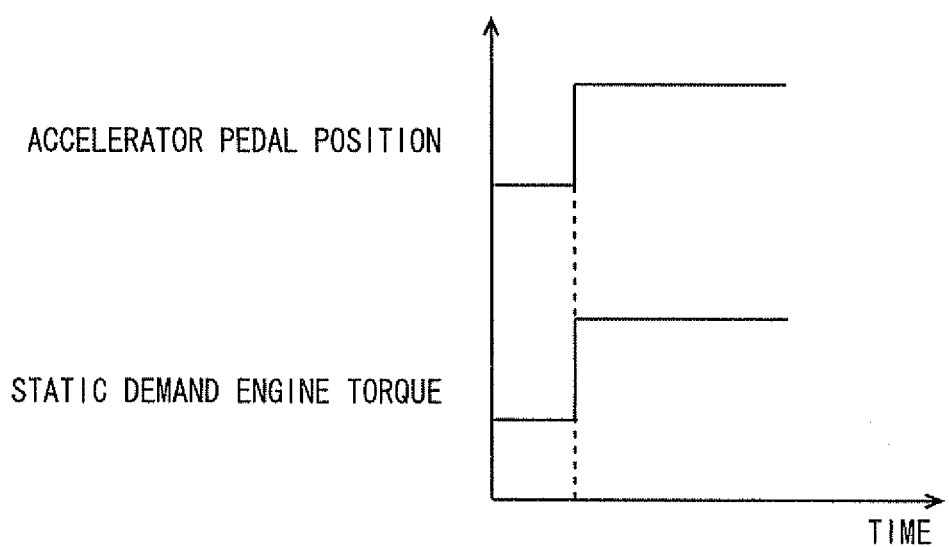
FIG. 6 is a graph showing a static torque demand amount.

More specifically, the static torque demand amount relative to engine 1000 is set in a static torque setter 9202. The static torque demand amount is determined without consideration of temporal influences such as a response property of the device including electronic throttle valve 8016 and a delay at the time of controlling as shown in FIG. 6.

The static torque demand amount set in static torque setter 9202 is converted into a dynamic torque demand amount in a converter 9204. The dynamic torque demand amount is determined in consideration of the temporal influences such as the response property of the device including electronic throttle valve 8016 and the delay at the time of controlling.

Figure 7:
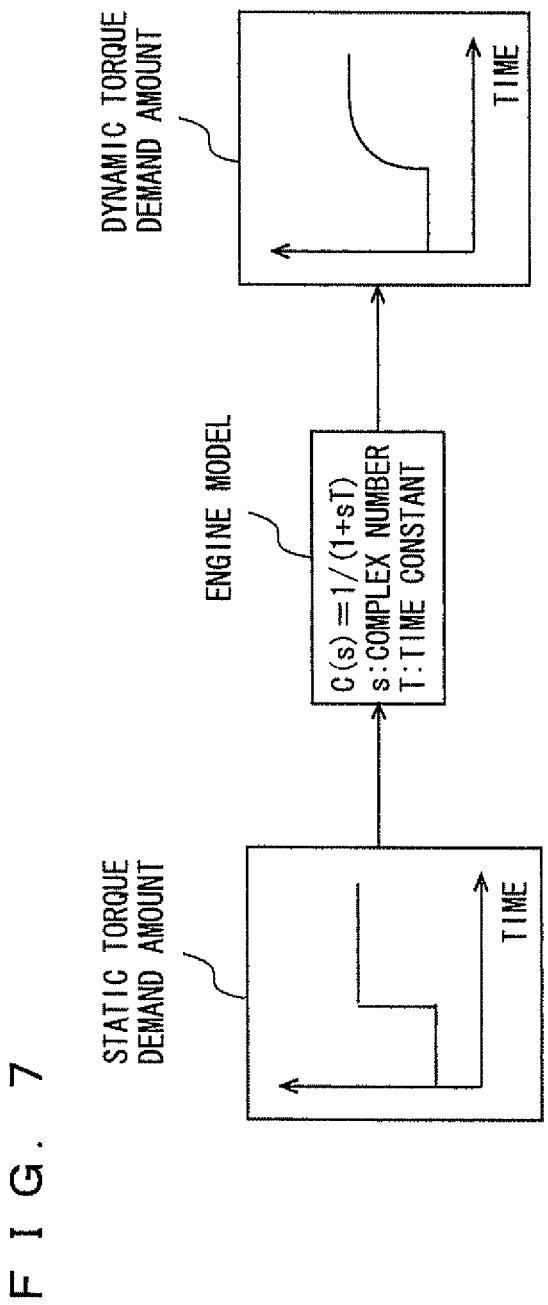
FIG. 7 is a diagram showing an engine model represented by a primary delay function.
Figure 8:
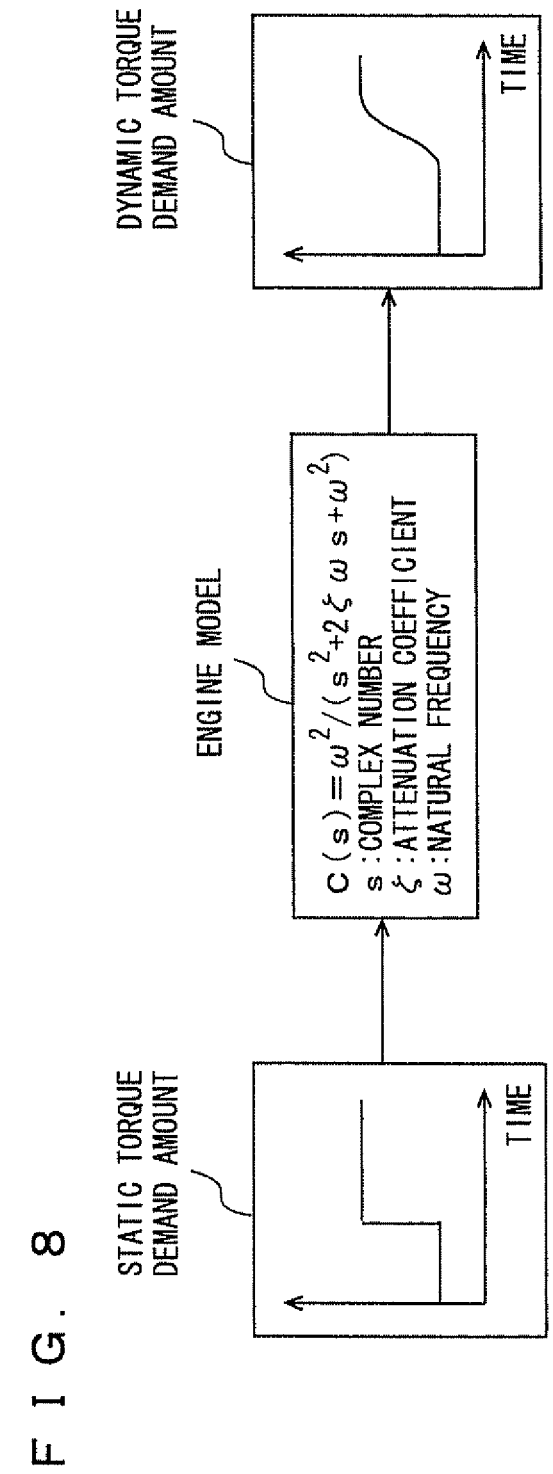
FIG. 8 is a diagram showing an engine model represented by a primary delay function.

For example, as shown in FIG. 7, the static torque demand amount is converted into the dynamic torque demand amount by adding, to the static torque demand amount, a delay at the time of controlling (actuating) the device such as electronic throttle valve 8016 using an engine model C (s) represented by a primary delay function. A time constant of the engine model shown in FIG. 7 is changed by the engine revolution number NE and the engine torque. It should be noted that an engine model C (s) represented by a secondary delay function may be used as shown in FIG. 8. These engine models are z-transformed when installed in ECU 8000.

Figure 9:
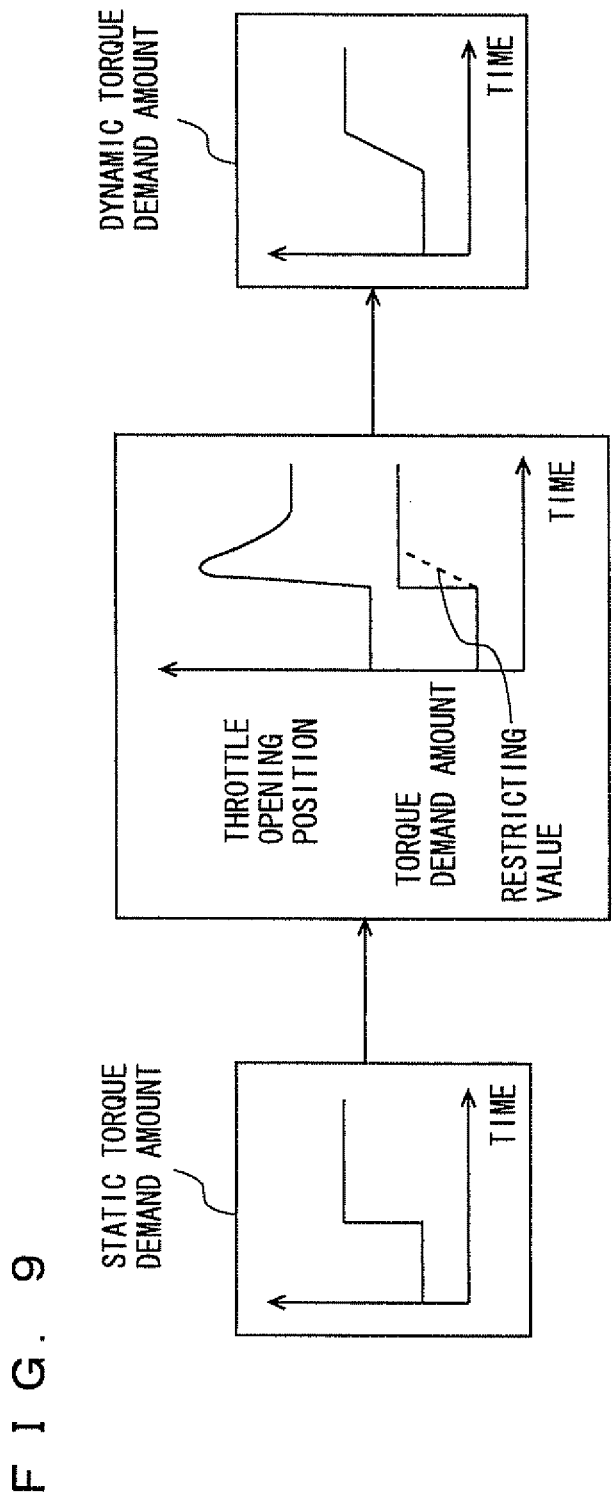
FIG. 9 is a diagram showing a dynamic torque demand amount obtained by restricting the static torque demand amount with a limit value.

As shown in FIG. 9, the static torque demand amount may be converted into the dynamic torque demand amount by restricting the static torque demand amount with a restricting value determined in accordance with the response property of the device such as electronic throttle valve 8016. The restricting value is predetermined, for example, by an experiment, a simulation, or the like.

Returning to FIG. 5, drivers support system 9210 automatically sets the dynamic torque demand amount in accordance with the action of the vehicle by a cruise control system, a parking assist system, a pre-crash safety system, and the like.

VDIM system 9220 is a system for integrating VSC (Vehicle Stability Control), TRC (TRaction Control), ABS (Anti lock Brake System), EPS (Electric Power Steering), and the like. The VDIM system 9220 calculates a difference between a traveling image of the driver with regard to control input for an accelerator, steering, and a brake and a vehicle action with regard to various types of sensor information, and controls the drive force of the vehicle, braking oil pressure, or the like so as to reduce the difference. VDIM system 9220 automatically sets the dynamic torque demand amount for controlling drive force of the vehicle.

The VSC is control of automatically setting an optimal value of the braking oil pressure of each wheel, the drive force of the vehicle, or the like so as to ensure stability of the vehicle in the case where a sensor detects a state in which front and rear wheels are likely to skid.

The TRC is control of automatically setting an optimal value of the braking oil pressure of each wheel, the drive force of the vehicle, or the like so as to ensure optimal drive force when a sensor senses idling of driven wheels at the time of starting and accelerating the vehicle on a slippery road surface.

The ABS is a control system of automatically setting an optimal value of the braking oil pressure so as to prevent locking of the wheels. The EPS is a control system of assisting an operation of a steering wheel by force of an electric motor.

Damping control system 9230 sets the dynamic torque demand amount for reducing pitting and bouncing of the vehicle calculated using a vehicle model from actual drive force of the vehicle, that is, engine torque or the like. A conventional technique may be used for a method of setting the drive force for reducing the pitting and bouncing of the vehicle. Therefore, a further detailed description will not be repeated here.

ECT torque controlling system 9240 sets the torque demand amount demanded relative to engine 1000 at the time of shifting of automatic transmission 2000.

Figure 10:
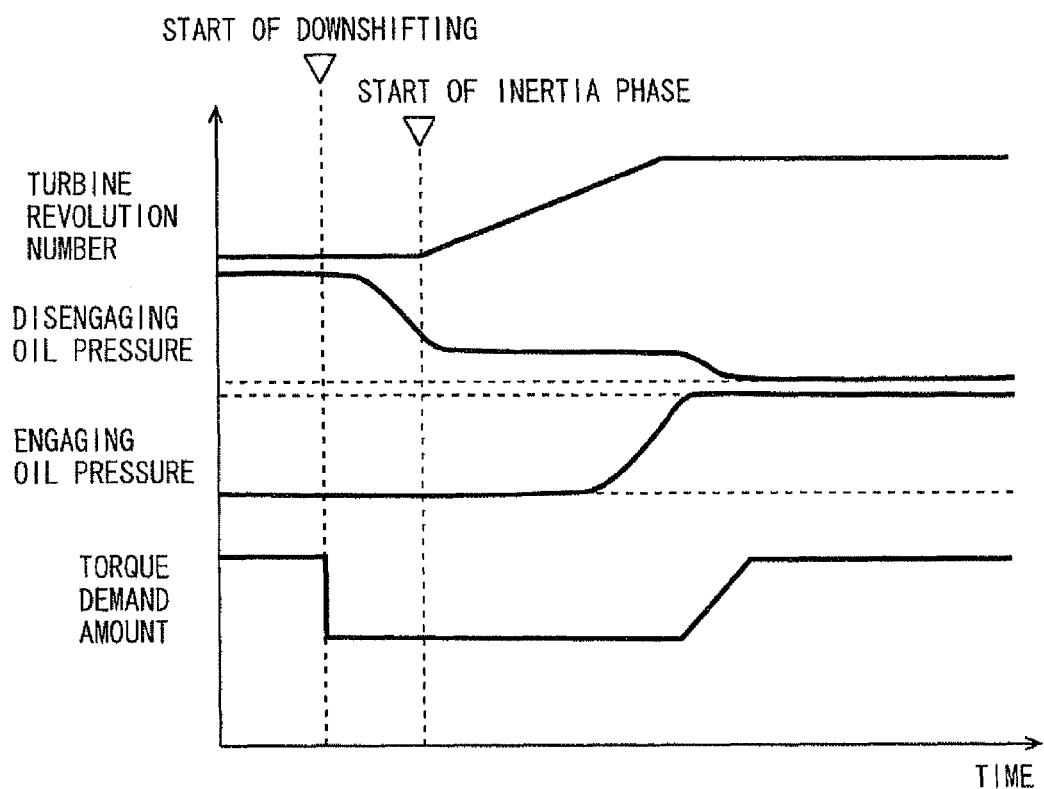
FIG. 10 is a diagram showing a torque demand amount set by an ECT torque controlling system at the time of downshifting.

For the purpose of avoiding a sudden increase in engine revolution number NE, for example, ECT torque controlling system 9240 sets the torque demand amount so as to decrease with or immediately after the start of downshifting and so as to increase immediately before and/or immediately after the completion of downshifting, as shown in FIG. 10.

Figure 11:
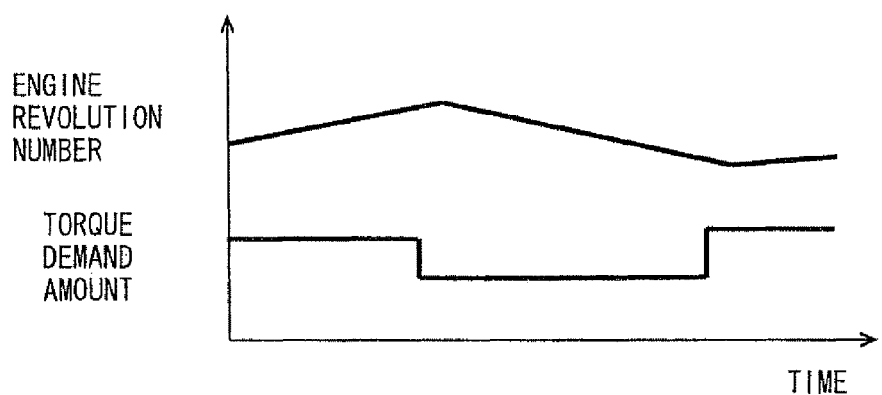
FIG. 11 is a diagram showing a torque demand amount set by an ECT torque controlling system at the time of upshifting.

Moreover, for reducing shift shock, ECT torque controlling system 9240 sets the torque demand amount so as to decrease with the start of the inertia phase during upshifting and so as to increase immediately before the completion of upshifting, as shown in FIG. 11.

It should be noted that the torque demand amount set by ECT torque controlling system 9240 is not limited to those described above.

The torque demand amount set by ECT torque controlling system 9240 is processed as one of the dynamic torque demand amount and the static torque demand amount. Whether the torque demand amount set by ECT torque controlling system 9240 is processed as the dynamic torque demand amount or the static torque demand amount is selected by selector 9104 of power train manager 9100.

In the case where the torque demand amount set by ECT torque controlling system 9240 is processed as the dynamic torque demand amount, for example, during shifting of automatic transmission 2000, engine 1000 is controlled in accordance with the torque demand amount set by ECT torque controlling system 9240. More specifically, engine 1000 is controlled so that actual engine torque attains the torque demand amount set by ECT torque controlling system 9240.

Figure 12:
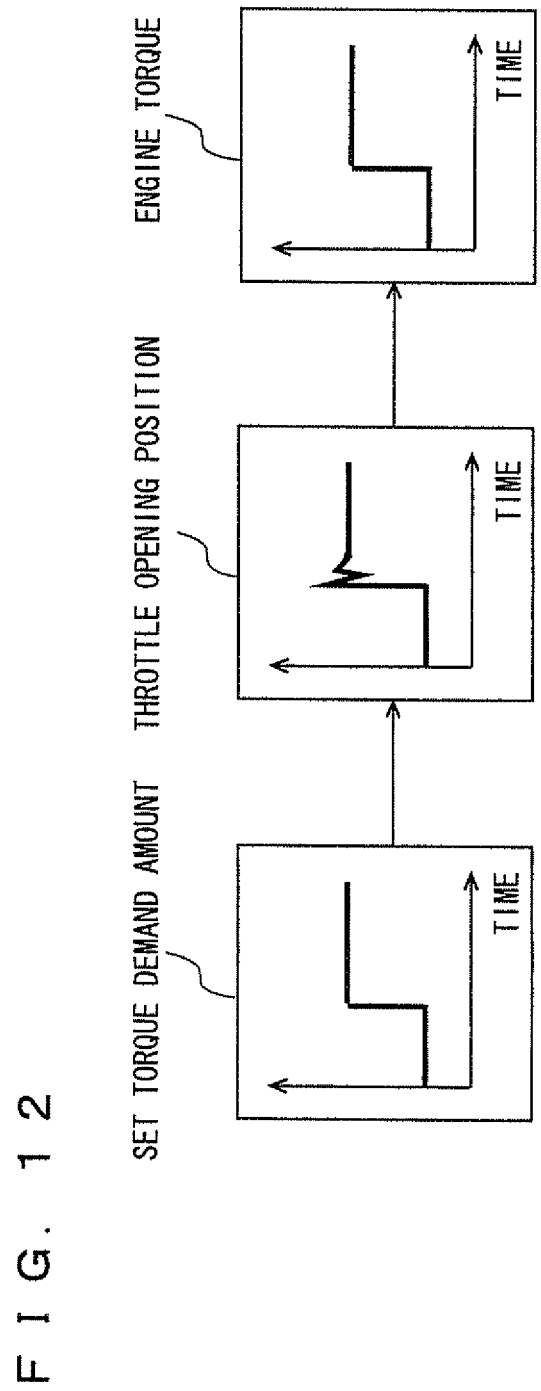
FIG. 12 is a diagram (1) showing changing characteristics of engine torque.

Accordingly, in the case where the torque demand amount set by ECT torque controlling system 9240 changes stepwise as shown in FIG. 12, the throttle opening position changes suddenly, and engine torque changes stepwise.

Figure 13:
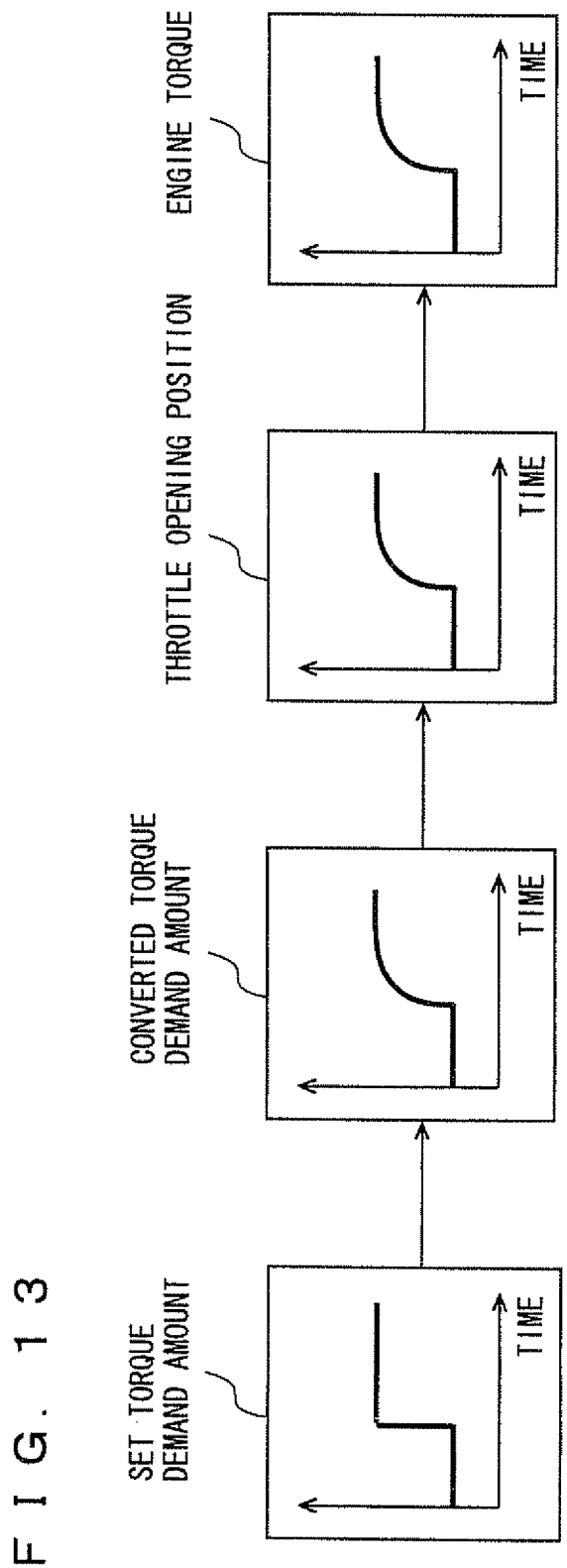
FIG. 13 is a diagram (2) showing changing characteristics of engine torque.

In the case where the torque demand amount set by ECT torque controlling system 9240 is processed as the static torque demand amount, the set torque demand amount is converted by converter 9106 of power train manager 9100 into the dynamic torque demand amount changing with a delay relative to the set torque demand amount, as shown in FIG. 13.

Similarly to converter 9204 of power train driver model 9200, converter 9106 of power train manager 9100 converts the torque demand amount set by ECT torque controlling system 9240 into the dynamic torque demand amount by using an engine model C (s) represented by a primary delay function or a secondary delay function, or by restricting the static torque demand amount with a restricting value determined in accordance with the response property of the device such as electronic throttle valve 8016. The method of converting the torque demand amount is not limited to those described above.

In the case where the torque demand amount set by ECT torque controlling system 9240 is converted into the dynamic torque demand amount, for example, during shifting of automatic transmission 2000, engine 1000 is controlled in accordance with the dynamic torque demand amount obtained by converting the torque demand amount set by ECT torque controlling system 9240. More specifically, engine 1000 is controlled so that actual engine torque attains the dynamic torque demand amount obtained by converting the torque demand amount set by ECT torque controlling system 9240.

Accordingly, even in the case where the torque demand amount set by ECT torque controlling system 9240 changes stepwise as shown in FIG. 13, the throttle opening position changes gradually, and engine torque changes gradually with a delay relative to the torque demand amount set by ECT torque controlling system 9240.

In accordance with a demand (command) from ECT torque controlling system 9240, selector 9104 of power train manager 9100 selects whether or not the torque demand amount set by ECT torque controlling system 9240 is processed as the dynamic torque demand amount, that is, switches between conversion of the set torque demand amount into a torque demand amount changing with a delay relative to the set torque demand amount and non-conversion.

For example, in the case where the difference between the set torque demand amount and actual engine torque is smaller than a threshold value, a state of converting the set torque demand amount into a torque demand amount changing with a delay relative to the set torque demand amount is switched to a non-conversion state.

Figure 14:
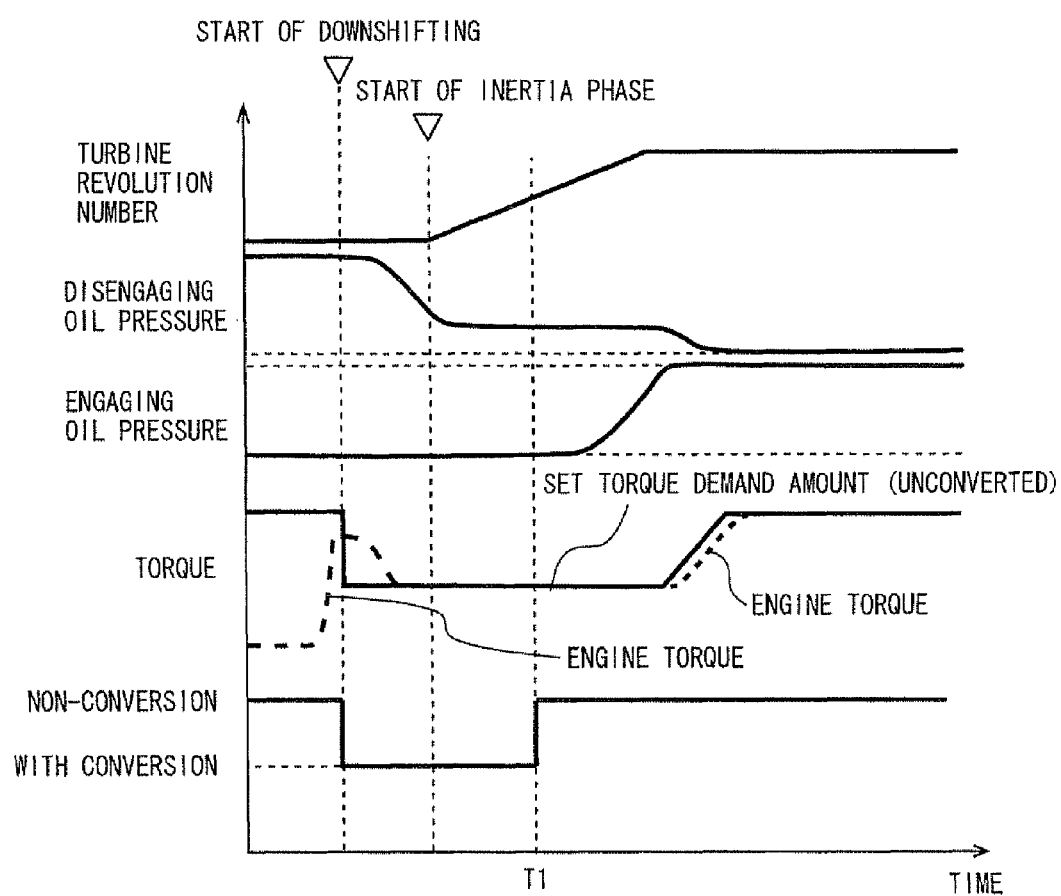
FIG. 14 is a diagram showing the timing when a state of converting a set torque demand amount into a torque demand amount changing with a delay relative to the set torque demand amount is switched to a non-conversion state.

More specifically, when automatic transmission 2000 downshifts, after the difference between the set torque demand amount and actual engine torque falls below the threshold value in the inertia phase, the state of converting the set torque demand amount into the torque demand amount changing with the delay relative to the set torque demand amount is switched to the non-conversion state at time T1 in FIG. 14.

An operation of the control apparatus according to the present embodiment based on the configuration as described above will now be described.

Assume the case of executing downshifting as a result of increasing the accelerator pedal position, that is, power-on downshifting.

Figure 15:
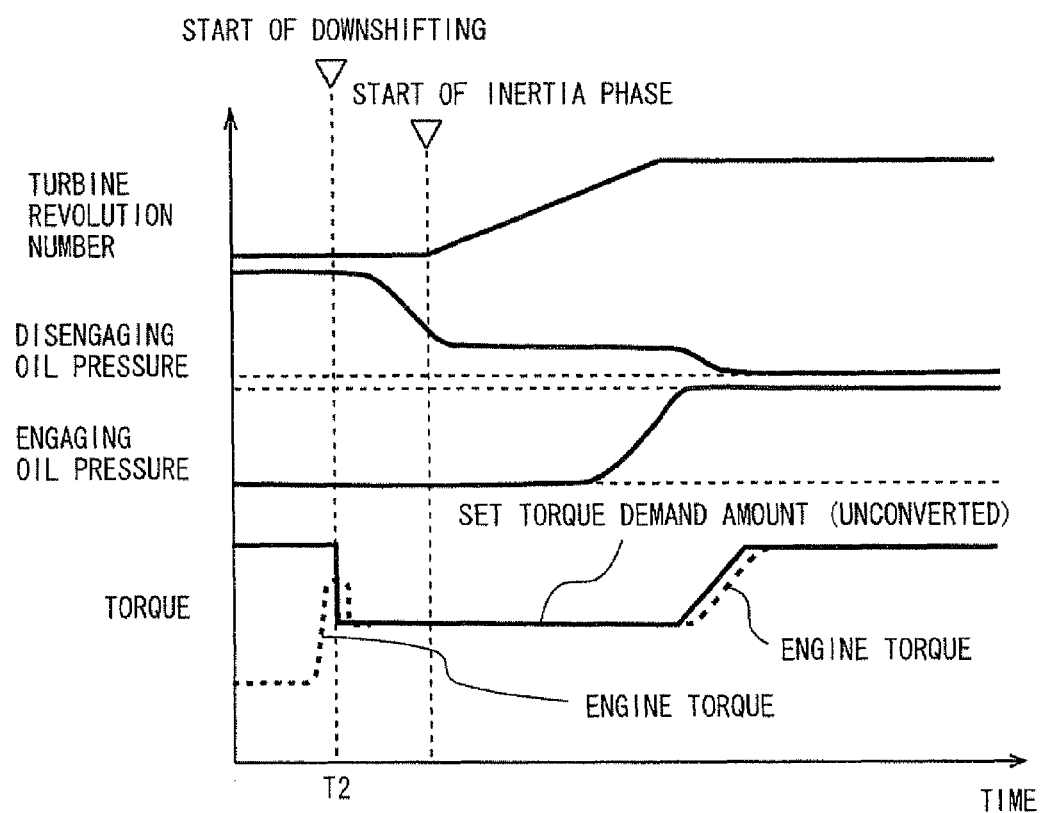
FIG. 15 is a diagram (1) showing changing characteristics of engine torque at the time of power-on downshifting.

In the state of not converting the torque demand amount set by ECT torque controlling system 9240 into the torque demand amount changing with the delay relative to the set torque demand amount, engine torque suddenly increased immediately before the start of downshifting at time T2 may be decreased suddenly immediately after the start of downshifting, as shown in FIG. 15. Such an action of engine torque may cause shock to occur. In the case where the torque demand amount is increased progressively immediately before and/or immediately after the completion of downshifting, actual engine torque follows up the torque demand amount with accuracy.

Figure 16:
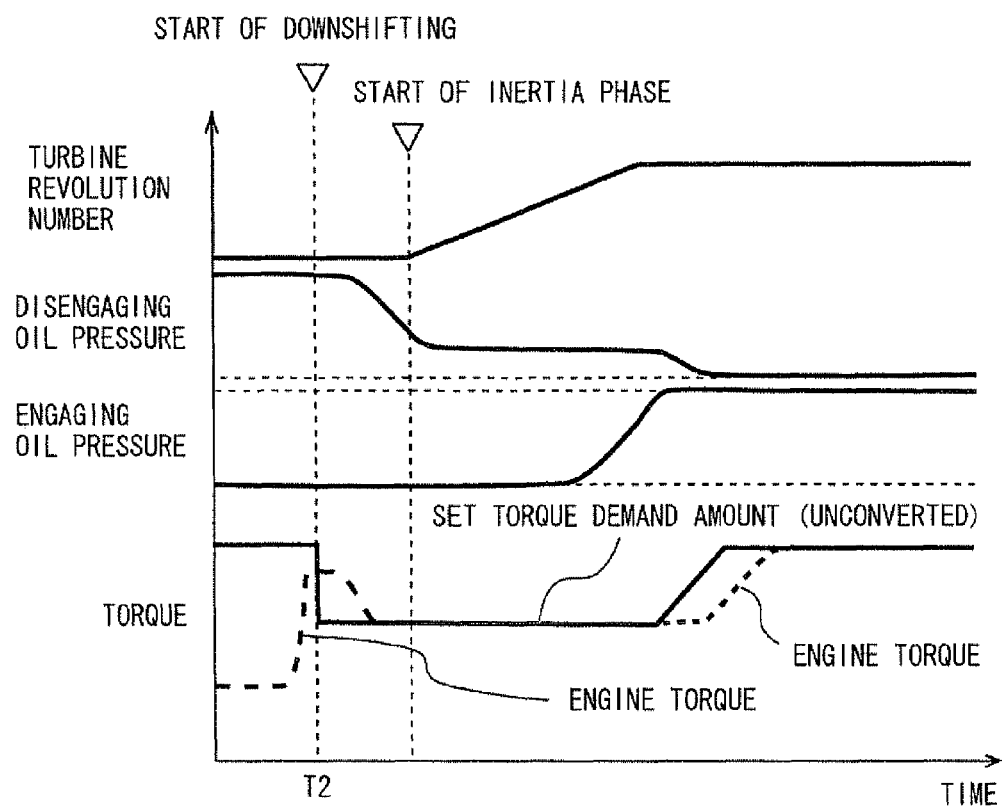
FIG. 16 is a diagram (2) showing changing characteristics of engine torque at the time of power-on downshifting.

In the state of converting the torque demand amount set by ECT torque controlling system 9240 into the torque demand amount changing with the delay relative to the set torque demand amount, engine torque suddenly increased immediately before the start of downshifting at time T2 changes gradually with a delay relative to the torque demand amount after the start of downshifting, as shown in FIG. 16. Accordingly, shock that may be caused by increase/decrease of engine torque can be reduced. However, in the case where the torque demand amount is increased progressively immediately before and/or immediately after the completion of downshifting, the difference between actual engine torque and the torque demand amount may be increased.

In view of the above-described characteristics, it is desirable that the state of converting the set torque demand amount into the torque demand amount changing with the delay relative to the set torque demand amount be switched to the non-conversion state during the execution of power-on downshifting (from the start to completion). This can reduce shock that may occur immediately after the start of power-on downshifting, and improve the accuracy of engine torque before and after the completion of power-on downshifting.

Figure 17:
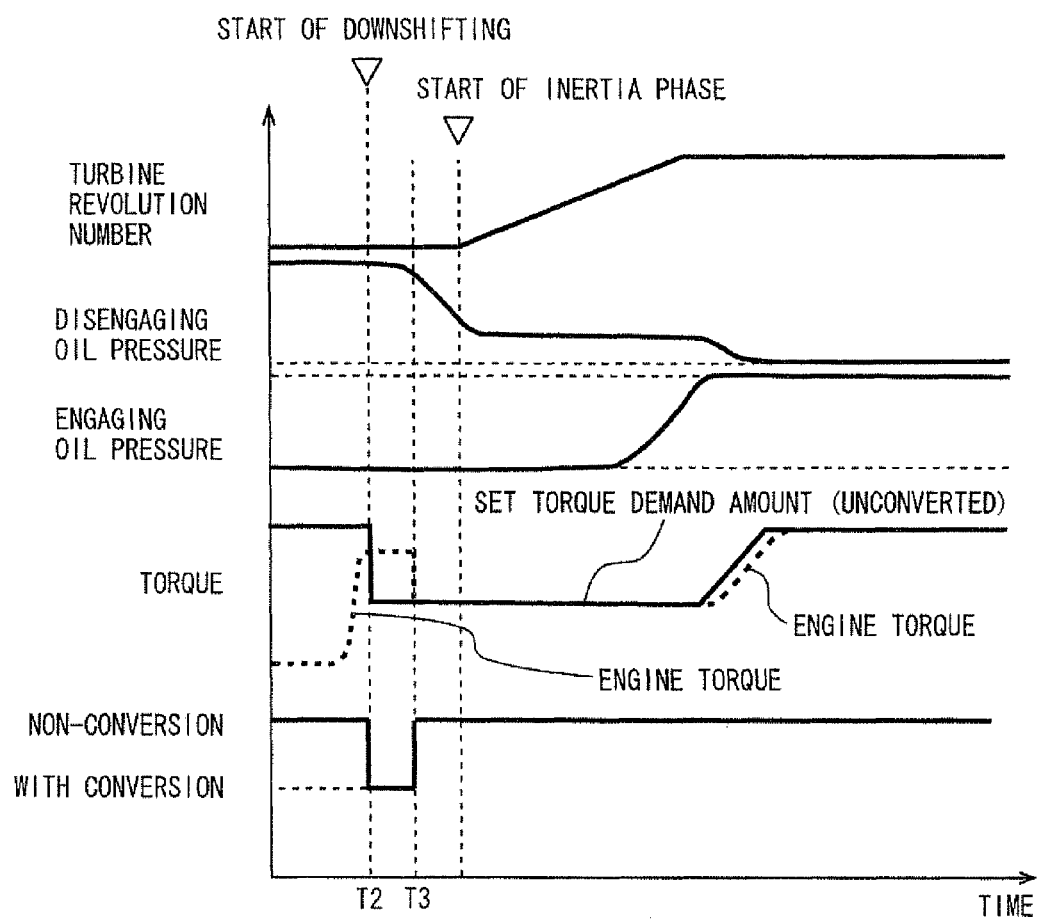
FIG. 17 is a diagram (3) showing changing characteristics of engine torque at the time of power-on downshifting.

However, as shown in FIG. 17, after the completion of power-on downshifting, when the state of converting the set torque demand amount into the torque demand amount changing with the delay relative to the set torque demand amount is switched to the non-conversion state at time T3 at which the difference between the torque demand amount and actual engine torque is great, engine torque may change suddenly at the time point of switching.

Figure 18:
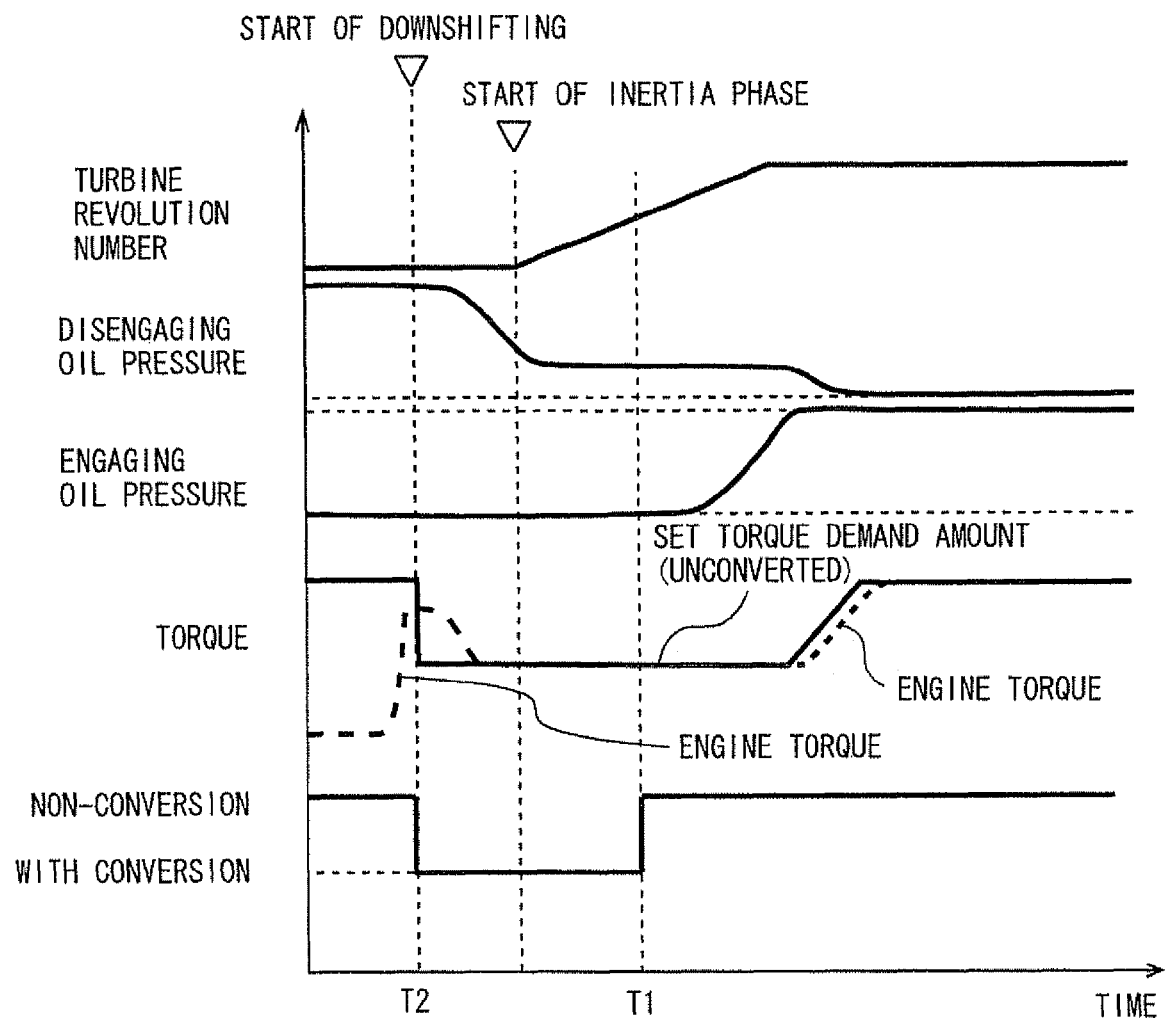
FIG. 18 is a diagram (4) showing changing characteristics of engine torque at the time of power-on downshifting.

Accordingly, in the present embodiment, as shown in FIG. 18, the torque demand amount set by ECT torque controlling system 9240 is converted into the torque demand amount changing with the delay relative to the set torque demand amount, from time T2 at which power-on downshifting is started to a time point at which the difference between the set torque demand amount and actual engine torque falls below the threshold value in the inertia phase.

In the inertia phase, after the difference between the set torque demand amount and actual engine torque falls below the threshold value, the state of converting the set torque demand amount into the torque demand amount changing with the delay relative to the set torque demand amount is switched to the non-conversion state at time T1.

This allows engine torque to gradually change immediately after the start of power-on downshifting so as to reduce shock, and improves the accuracy of engine torque around the completion of power-on downshifting.

As described above, the present embodiment allows selection between the state of controlling engine torque in accordance with the torque demand amount set by the ECT torque controlling system and the state of controlling engine torque in accordance with the torque demand amount changing with the delay relative to the set torque demand amount. Accordingly, the changing speed of engine torque can be altered in accordance with various circumstances.

Second Embodiment

A second embodiment of the present invention will be described below. The present embodiment is different from the aforementioned first embodiment in that the state of converting the set torque demand amount into a torque demand amount changing with a delay relative to the set torque demand amount is selected when the difference between the set torque demand amount and actual engine torque is smaller than a threshold value.

Another difference from the aforementioned first embodiment lies in that the state of not converting the set torque demand amount into the torque demand amount changing with the delay relative to the set torque demand amount is selected when the difference between the set torque demand amount and actual engine torque is greater than the threshold value.

The remaining configuration is the same as that described in the aforementioned first embodiment. Therefore, a detailed description thereof will not be repeated here.

Assume the case of executing upshifting with accelerator pedal 8008 being operated, that is, power-on upshifting.

Figure 19:
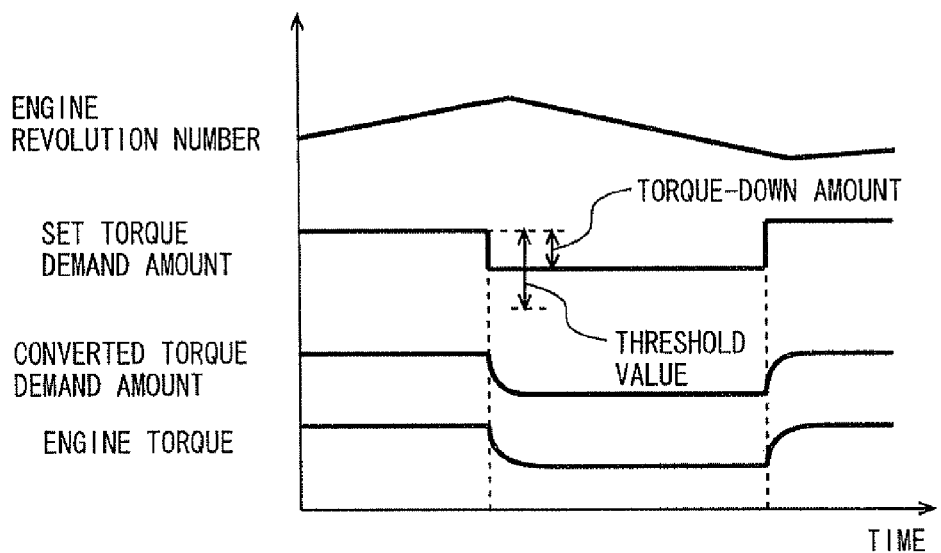
FIG. 19 is a diagram (1) showing changing characteristics of engine torque at the time of power-on upshifting.

As shown in FIG. 19, in the inertia phase, when the difference between the set torque demand amount and actual engine torque is smaller than the threshold value, the set torque demand amount is converted into the torque demand amount changing with the delay relative to the set torque demand amount. In other words, when a torque-down amount in the inertia phase is smaller than the threshold value, the set torque demand amount is converted into the torque demand amount changing with the delay relative to the set torque demand amount.

Accordingly, the changing speed of engine torque can be reduced. Overshoot and undershoot of engine torque are therefore less likely to occur. As a result, the accuracy of engine torque can be improved.

Figure 20:
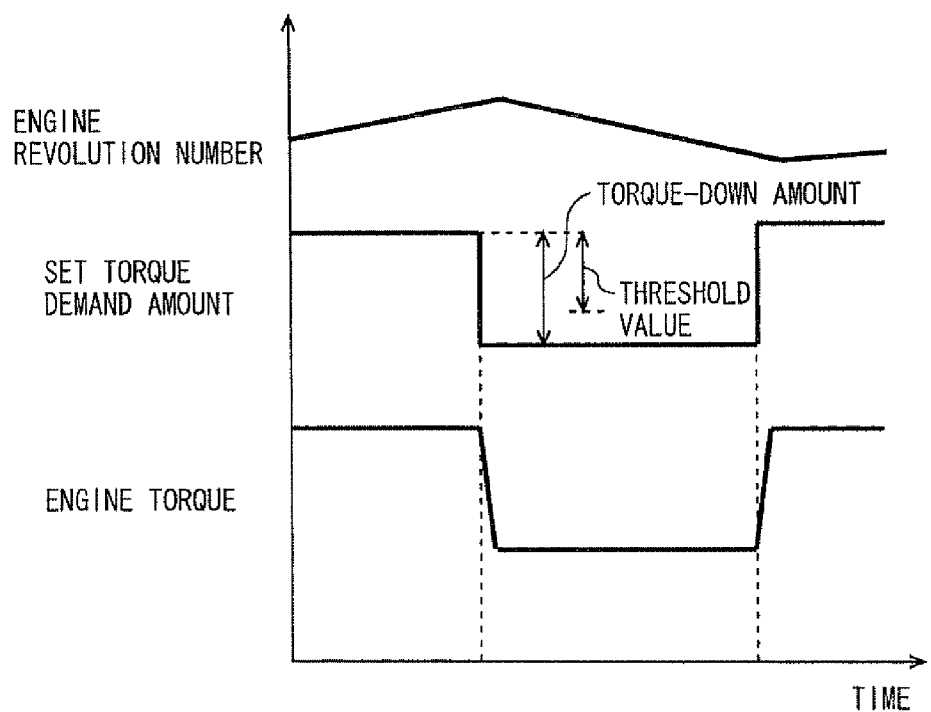
FIG. 20 is a diagram (2) showing changing characteristics of engine torque at the time of power-on upshifting.

As shown in FIG. 20, in the inertia phase, when the difference between the set torque demand amount and actual engine torque is greater than the threshold value, the set torque demand amount is not converted into the torque demand amount changing with the delay relative to the set torque demand amount. In other words, when the torque-down amount in the inertia phase is larger than the threshold value, the set torque demand amount is not converted into the torque demand amount changing with the delay relative to the set torque demand amount. The changing speed of engine torque can thereby be increased. Accordingly, the follow-up characteristic of engine torque relative to the torque demand amount can be improved.

In the case where the torque demand amount is set by ECT torque controlling system 9240 so as to decrease with the throttle opening being smaller than a threshold value, the state of converting the set torque demand amount into the torque demand amount changing with the delay relative to the set torque demand amount may be selected.

For example, assume the case of executing power-on upshifting of automatic transmission 2000 with the throttle opening being smaller than the threshold value. In the inertia phase, in the case where the torque demand amount is set by ECT torque controlling system 9240 so as to decrease to a predetermined value, the set torque demand amount is converted into the torque demand amount changing with the delay relative to the set torque demand amount.

When the throttle opening is smaller than the threshold value, the maximum value of the torque-down amount is low because of low engine torque. Therefore, in this case, the changing speed of engine torque can be reduced when the torque-down amount in the inertia phase is small. Overshoot and undershoot of engine torque are therefore less likely to occur. As a result, the accuracy of engine torque can be improved.

In the case where the torque demand amount is set by ECT torque controlling system 9240 so as to decrease with the throttle opening being larger than the threshold value, the state of not converting the set torque demand amount into the torque demand amount changing with the delay relative to the set torque demand amount may be selected.

For example, assume the case of executing power-on upshifting of automatic transmission 2000 with the throttle opening being larger than the threshold value. In the inertia phase, in the case where the torque demand amount is set by ECT torque controlling system 9240 so as to decrease to a predetermined value, the set torque demand amount is not converted into the torque demand amount changing with the delay relative to the set torque demand amount.

When the throttle opening is larger than the threshold value, the maximum value of the torque-down amount is high because of high engine torque. Therefore, in this case, the changing speed of engine torque can be increased when the torque-down amount in the inertia phase is large. Accordingly, the follow-up characteristic of engine torque relative to the torque demand amount can be improved.

It should be construed that embodiments disclosed herein are by way of illustration in all respects, not by way of limitation. It is intended that the scope of the present invention is defined by claims, not by the description above, and includes all modifications equivalent in meaning and scope to the claims.

The invention claimed is:

1. A control apparatus for a drive source, comprising:
a control unit configured to:

set a static target torque for an output torque of a drive source;

convert the static target torque into a dynamic target torque changing with a delay relative to the static target torque; and switch a target torque, which is used to control the output torque of the drive source, from the dynamic target torque to the static target torque in an inertia phase during downshifting of the transmission.

2. A control method for a drive source, comprising the steps of:

setting a static target torque for an output torque of a drive source;

converting the static target torque into a dynamic target torque changing with a delay relative to the static target torque; and switching a target torque, which is used to control the output torque of the drive source, from the dynamic target torque to the static target torque in an inertia phase during downshifting of the transmission.

3. A control apparatus for a drive source, comprising:

setting means for setting a static target torque for an output torque of a drive source;

converting means for converting the static target torque into a dynamic target torque changing with a delay relative to the static target torque; and switching means for switching a target torque, which is used to control the output torque of the drive source, from the dynamic target torque to the static target torque in an inertia phase during downshifting of the transmission.

* * * * *